United States Patent
Iida

(10) Patent No.: US 8,183,837 B2
(45) Date of Patent: May 22, 2012

(54) CONTROL DEVICE AND CONTROL METHOD FOR ELECTRIC SYSTEM

(75) Inventor: Takahide Iida, Kariya (JP)

(73) Assignees: Toyota Jidosha Kabushiki Kaisha, Toyota (JP); Kabushiki Kaisha Toyota Jidoshokki, Kariya-shi (JP)

(*) Notice: Subject to any disclaimer, the term of this patent is extended or adjusted under 35 U.S.C. 154(b) by 395 days.

(21) Appl. No.: 12/451,275

(22) PCT Filed: Jun. 10, 2008

(86) PCT No.: PCT/JP2008/060938
§ 371 (c)(1),
(2), (4) Date: Nov. 4, 2009

(87) PCT Pub. No.: WO2008/153174
PCT Pub. Date: Dec. 18, 2008

(65) Prior Publication Data
US 2010/0127669 A1    May 27, 2010

(30) Foreign Application Priority Data
Jun. 11, 2007 (JP) .................. 2007-154324

(51) Int. Cl.
*H01M 10/44* (2006.01)
*H01M 10/46* (2006.01)
(52) U.S. Cl. .................................................. 320/138
(58) Field of Classification Search .............. 320/103, 320/107, 116, 121, 138
See application file for complete search history.

(56) References Cited

U.S. PATENT DOCUMENTS

| 5,664,635 A | 9/1997 | Koga et al. |
| 5,847,545 A * | 12/1998 | Chen et al. ................... 320/138 |
| 2003/0107352 A1 | 6/2003 | Downer et al. |
| 2005/0242772 A1 * | 11/2005 | Cha .............................. 320/115 |

FOREIGN PATENT DOCUMENTS

| JP | A 8-37703 | 2/1996 |
| JP | A 8-251711 | 9/1996 |
| JP | A 2000-116014 | 4/2000 |
| JP | A 2002-10502 | 1/2002 |
| JP | A 2002-142379 | 5/2002 |
| JP | A 2003-209969 | 7/2003 |
| JP | A 2005-168259 | 6/2005 |

OTHER PUBLICATIONS

Search Report issued for International Application No. PCT/JP2008/060938 on Aug. 19, 2008.
Decision to Grant issued in Japanese Patent Application No. 2009-519329; mailed Dec. 20, 2011; with English-language translation.

* cited by examiner

*Primary Examiner* — Edward Tso
(74) *Attorney, Agent, or Firm* — Oliff & Berridge, PLC

(57) ABSTRACT

In an electric system including a first converter and a second converter connected in parallel, an ECU executes a program including a step of selecting a charging mode for a first battery pack connected to the first converter and a charging mode for a second battery pack connected to the second converter, and a step of controlling a charger connected to the first battery pack, the first converter and the second converter to charge the first battery pack and the second battery pack in the selected charging modes.

21 Claims, 9 Drawing Sheets

F I G. 2
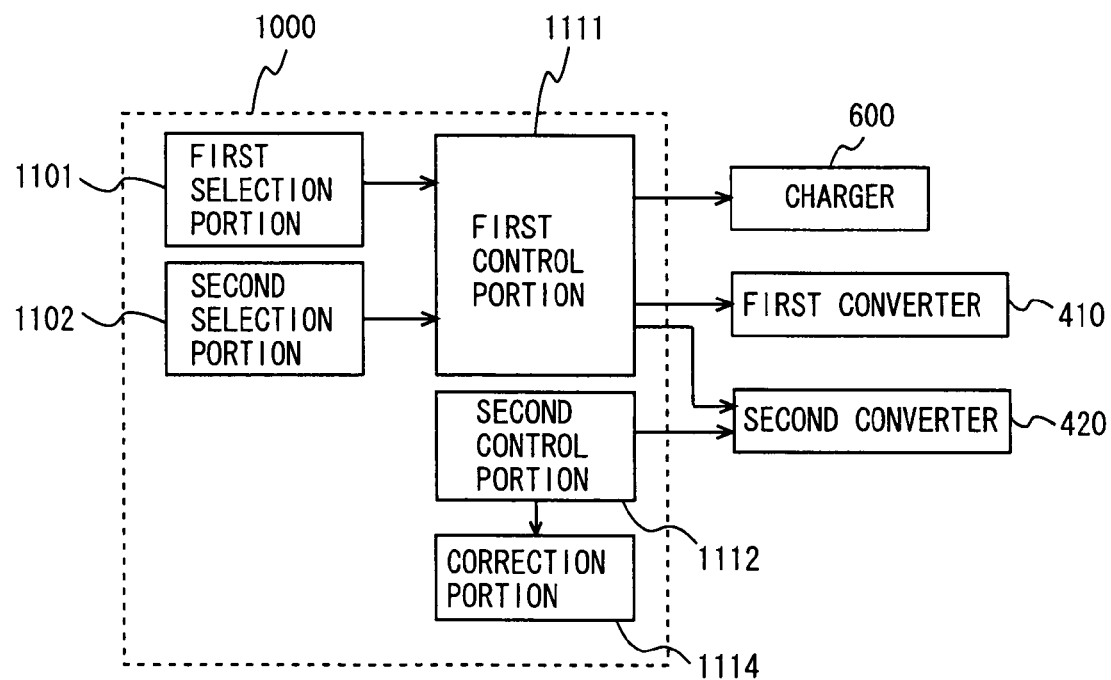

CONTROL DEVICE AND CONTROL METHOD FOR ELECTRIC SYSTEM

TECHNICAL FIELD

The present invention relates to a control device and a control method for an electric system, and more particularly to a technique of charging each power storage mechanism in an individually set mode.

BACKGROUND ART

Conventionally, hybrid vehicles, electric vehicles and the like have been known that run by driving force of an electric motor. These vehicles have a battery mounted thereon for storing electric power to be supplied to the electric motor serving as a driving source.

Japanese Patent Laying-Open No. 8-37703 discloses a hybrid electric vehicle including a battery charged by an outside charger, a driving motor for driving wheels by electric power from the battery, an engine used indirectly for driving the wheels, a control unit for controlling operations of the motor and of the engine, and a determination unit for determining whether the battery meets prescribed specifications. When means for determining battery specifications determines that the battery does not meet the prescribed specifications, the control unit controls at least one of the motor and the engine to limit output of the driving motor.

In order to increase a distance that can be traveled on a single charge, it is conceivable to increase a capacity by increasing the number of power storage mechanisms, such as batteries, mounted on a vehicle. When a plurality of power storage mechanisms are mounted on the vehicle, however, charging conditions of all the power storage mechanisms may not necessarily be equal. For example, sufficiently charged power storage mechanisms and insufficiently charged power storage mechanisms may both be present, so that states of charge and the like may vary among the power storage mechanisms. The varying states of charge and the like among the power storage mechanisms may result in varying rates of deterioration among the power storage mechanisms. However, Japanese Patent Laying-Open No. 8-37703 does not provide any descriptions about such a problem.

DISCLOSURE OF THE INVENTION

An object of the present invention is to provide a control device and a control method for an electric system that are capable of reducing the difference in rates of deterioration among a plurality of power storage mechanisms.

A control device for an electric system according to an aspect includes a first converter for varying a voltage, a second converter connected in parallel to the first converter for varying a voltage, a first power storage mechanism connected to the first converter for storing electric power, a second power storage mechanism connected to the second converter for storing electric power, a charger connected to the first power storage mechanism to supply electric power, and an operation unit. The operation unit selects a charging mode for the first power storage mechanism, selects a charging mode for the second power storage mechanism, and controls the charger, the first converter and the second converter to charge the first power storage mechanism and the second power storage mechanism in the selected modes respectively.

According to this configuration, the first converter and the second converter are connected in parallel. The first converter is connected to the first power storage mechanism. The second converter is connected to the second power storage mechanism. The first power storage mechanism is connected to the charger. The charging modes for the respective power storage mechanisms are selected individually. The charger, the first converter and the second converter are controlled to charge the first power storage mechanism and the second power storage mechanism in the selected modes respectively. Accordingly, each power storage mechanism can be charged in a mode appropriate to a condition of each power storage mechanism. Therefore, by charging all the power storage mechanisms sufficiently, for example, the states of charge of the respective power storage mechanisms can be equalized. Consequently, a control device or a control method for an electric system can be provided that is capable of reducing the difference in rates of deterioration among a plurality of power storage mechanisms.

Preferably, the operation unit controls the first converter and the second converter to charge the second power storage mechanism in the selected mode, and controls the charger to charge the first power storage mechanism in the selected mode.

According to this configuration, the second power storage mechanism is charged in the selected mode by controlling the first converter and the second converter, and the first power storage mechanism is charged in the selected mode by controlling the charger. Thus, the electric power output from the charger can be supplied directly to the first power storage mechanism, and the electric power output from the charger can be supplied indirectly to the second power storage mechanism, thereby charging the first power storage mechanism and the second power storage mechanism sufficiently.

Still preferably, the operation unit controls the charger to charge the first power storage mechanism in the selected mode by outputting a current that is a sum of a current supplied to the first power storage mechanism and a current supplied to the second power storage mechanism.

According to this configuration, the charger is controlled to output the current that is the sum of the current supplied to the first power storage mechanism and the current supplied to the second power storage mechanism, thereby supplying a current sufficiently to the first power storage mechanism and the second power storage mechanism.

Still preferably, the operation unit selects either a mode of maintaining electric power to be charged into the first power storage mechanism constant or a mode of maintaining a current to be charged into the first power storage mechanism constant, and selects either a mode of maintaining electric power to be charged into the second power storage mechanism constant or a mode of maintaining a current to be charged into the second power storage mechanism constant.

According to this configuration, each power storage mechanism can be charged in either the mode of maintaining the charging electric power constant or the mode of maintaining the charging current constant.

Still preferably, the operation unit selects the mode of maintaining the electric power to be charged into the first power storage mechanism constant when a state of charge of the first power storage mechanism is lower than a threshold value, selects the mode of maintaining the current to be charged into the first power storage mechanism constant when the state of charge of the first power storage mechanism is higher than the threshold value, selects the mode of maintaining the electric power to be charged into the second power storage mechanism constant when a state of charge of the second power storage mechanism is higher than the threshold value, and selects the mode of maintaining the current to be charged into the second power storage mechanism constant when the state of charge of the second power storage mechanism is lower than the threshold value.

According to this configuration, each power storage mechanism is charged in the mode of maintaining the electric power constant when the state of charge is lower than the threshold value. Each power storage mechanism is charged in the mode of maintaining the current constant when the state of charge is higher than the threshold value. Accordingly, when the state of charge is low, the power storage mechanism can be charged quickly by charging with constant electric power, and when the state of charge is high, the power storage mechanism can be charged by charging with a constant current until the state of charge of the power storage mechanism attains to an approximately maximum value. Therefore, the time required for charging the power storage mechanism can be reduced while charging the power storage mechanism sufficiently.

Still preferably, when a target value of a current charged into the second power storage mechanism is lower than a minimum value of a current output from the second converter, the operation unit controls the second converter to output a current intermittently.

According to this configuration, when the target value of the current charged into the second power storage mechanism is lower than the minimum value of the current output from the second converter, the second converter is controlled to output a current intermittently. Therefore, an average value of the current output from the second power storage mechanism can be made lower than the minimum value, thereby supplying the second power storage mechanism with a current lower than the minimum value of the current output from the second converter.

Still preferably, the operation unit controls the charger, the first converter and the second converter to charge the first power storage mechanism and the second power storage mechanism simultaneously in charging modes different between the first power storage mechanism and the second power storage mechanism.

According to this configuration, the first power storage mechanism and the second power storage mechanism are charged simultaneously in different charging modes. Therefore, each power storage mechanism can be charged quickly in a mode appropriate to the condition of each power storage mechanism.

BRIEF DESCRIPTION OF THE DRAWINGS

FIG. 2 is a functional block diagram of an ECU.

BEST MODES FOR CARRYING OUT THE INVENTION

An embodiment of the present invention will be described hereinafter with reference to the drawings. In the following description, the same components are designated with the same characters. Their names and functions are also the same. Accordingly, detailed descriptions thereof will not be repeated.

Figure 1:
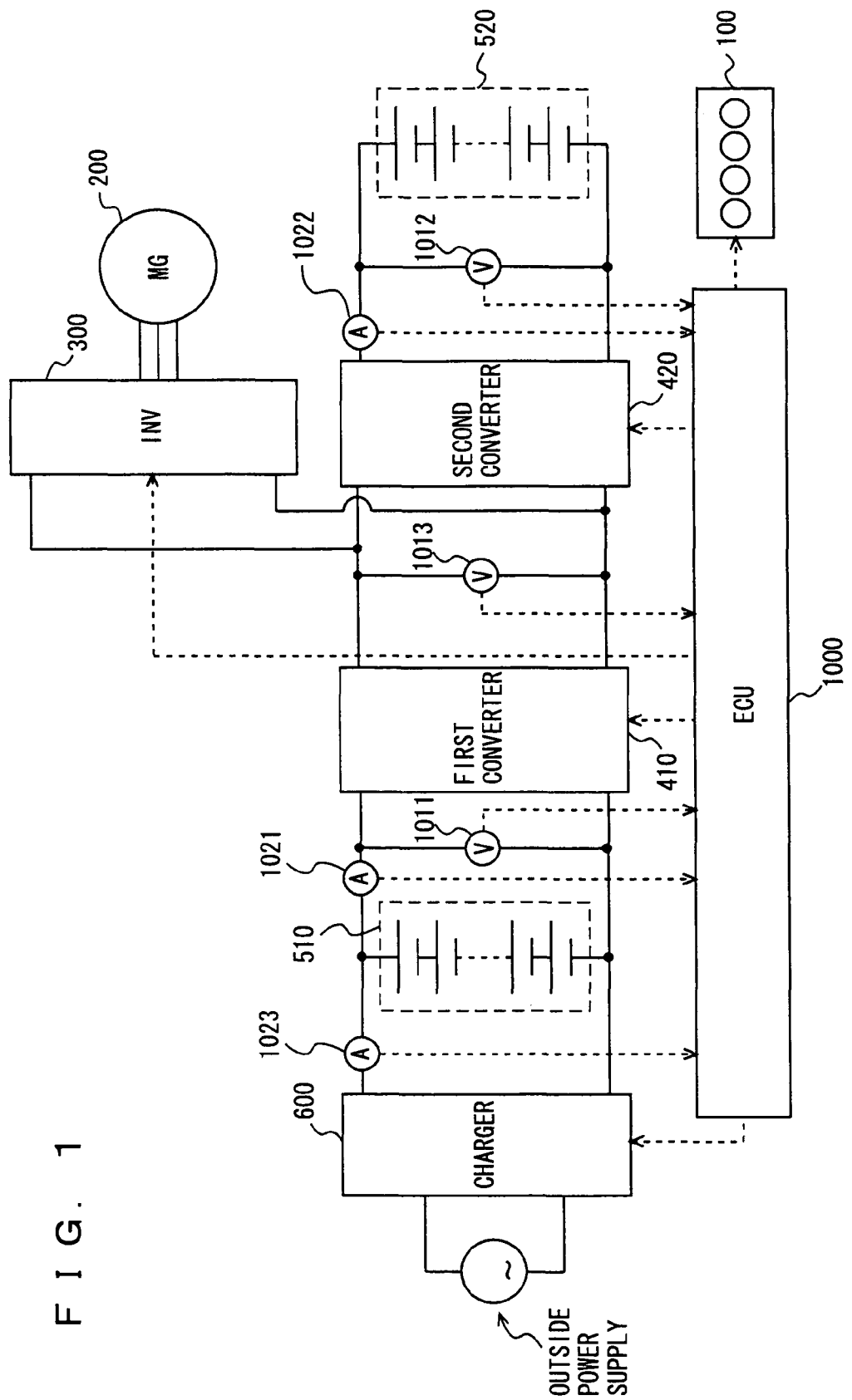
FIG. 1 is a schematic configuration diagram showing a hybrid vehicle.

Referring to FIG. 1, a hybrid vehicle having a control device for an electric system according to the present embodiment will be described. This hybrid vehicle has an engine 100, an MG (Motor Generator) 200, an inverter 300, a first converter 410, a second converter 420, a first battery pack 510, a second battery pack 520, a charger 600, and an ECU (Electronic Control Unit) 1000. It is noted that ECU 1000 may be divided into a plurality of ECUs.

The electric system includes MG 200, inverter 300, first converter 410, second converter 420, first battery pack 510, second battery pack 520, and charger 600. The hybrid vehicle runs by driving force from at least any one of engine 100 and MG 200.

MG 200 is a three-phase AC motor. MG 200 is driven by electric power stored in first battery pack 510 and second battery pack 520. MG 200 is supplied with electric power having been converted from DC to AC by inverter 300.

The driving force of MG 200 is transmitted to wheels, so that MG 200 assists engine 100, runs the vehicle by its driving force, and the like. During regenerative braking of the hybrid vehicle, on the other hand, MG 200 is driven by the wheels, to be operated as a generator. MG 200 thus operates as a regenerative brake converting braking energy to electric power. The electric power generated by MG 200 is converted from AC to DC by inverter 300, and then stored in first battery pack 510 and second battery pack 520.

First battery pack 510 and second battery pack 520 are assembled batteries formed by integrating a plurality of battery cells into a battery module, and further connecting a plurality of the battery modules in series. A discharge voltage from first battery pack 510 and a charging voltage into first battery pack 510 are adjusted by first converter 410. A discharge voltage from second battery pack 520 and a charging voltage into second battery pack 520 are adjusted by second converter 420.

First converter 410 and second converter 420 are connected in parallel. First converter 410 is connected to first battery pack 510. Second converter 420 is connected to second battery pack 520. Thus, first battery pack 510 and second battery pack 520 are connected in parallel via first converter 410 and second converter 420. Inverter 300 is connected between first converter 410 and second converter 420.

A positive electrode terminal and a negative electrode terminal of first battery pack 510 are connected to charger 600. Thus, first battery pack 510 and second battery pack 520 are connected in parallel with respect to charger 600. It is noted that capacitors (condensers) may be used instead of the batteries.

When charging first battery pack 510 and second battery pack 520, charger 600 supplies electric power to first battery pack 510 and second battery pack 520 from outside the hybrid vehicle. It is noted that charger 600 may be installed outside the hybrid vehicle.

In the present embodiment, first battery pack 510 and second battery pack 520 are charged in a mode of maintaining an electric power value constant (hereinafter also referred to as a CP charging mode) or a mode of maintaining a voltage value constant (hereinafter also referred to as a CV charging mode).

It is noted that instead of the CV charging mode, a mode of maintaining a current value constant (hereinafter also referred to as a CC charging mode) may be used. That is, first battery pack 510 and second battery pack 520 may be charged in the CP charging mode or the CC charging mode.

Engine 100, inverter 300, first converter 410, second converter 420 and charger 600 are controlled by ECU 1000. ECU 1000 receives signals from voltage sensors 1011 to 1013 and current sensors 1021 to 1023.

Voltage sensor 1011 detects a voltage value of first battery pack 510. Voltage sensor 1012 detects a voltage value of second battery pack 520. Voltage sensor 1013 detects a system voltage value (a voltage value of a section between first converter 410 and second converter 420).

Current sensor 1021 detects a value of a current discharged from first battery pack 510 or a value of a current charged into first battery pack 510. Current sensor 1022 detects a value of a current discharged from second battery pack 520 or a value of a current charged into second battery pack 520. Current sensor 1023 detects a value of a current supplied from charger 600 to first battery pack 510 and second battery pack 520.

ECU 1000 calculates states of charge (SOC) of first battery pack 510 and second battery pack 520 based on the voltage values, the current values and the like input from these sensors. Well-known common techniques may be used as a method of calculating the state of charge, and a detailed description thereof will therefore not be repeated here.

Referring to FIG. 2, a function of ECU 1000 will be described. It is noted that the function of ECU 1000 which will be described below may be implemented with software, or may be implemented with hardware.

ECU 1000 includes a first selection portion 1101, a second selection portion 1102, a first control portion 1111, a second control portion 1112, and a correction portion 1114.

Figure 3:
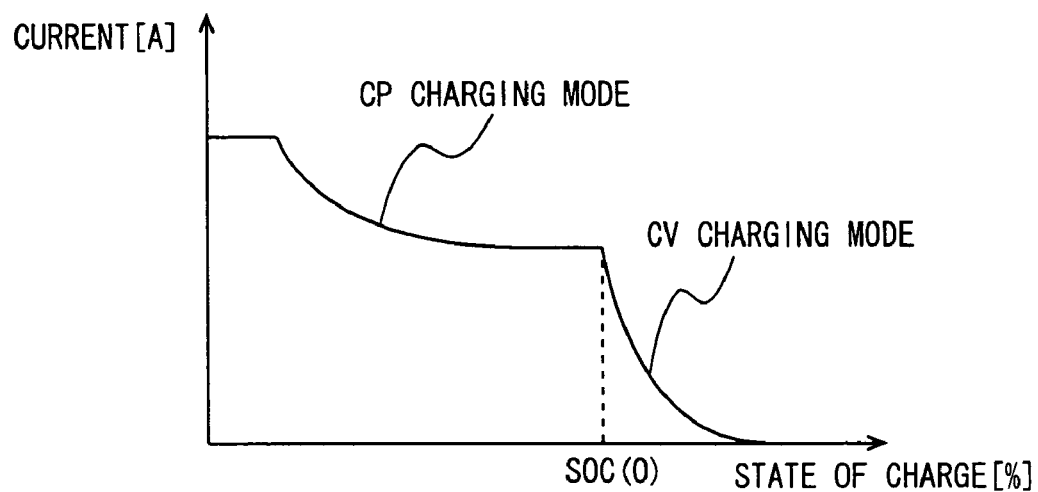
FIG. 3 shows a current value in a CP charging mode and a CV charging mode.

First selection portion 1101 determines a charging mode for first battery pack 510 in accordance with the state of charge of first battery pack 510. As shown in FIG. 3, when the state of charge of first battery pack 510 is lower than a threshold value SOC (0), the CP charging mode is selected. When the state of charge of first battery pack 510 is higher than or equal to threshold value SOC (0), the CV charging mode is selected.

Second selection portion 1102 determines a charging mode for second battery pack 520 in accordance with the state of charge of second battery pack 520. When the state of charge of second battery pack 520 is lower than threshold value SOC (0), the CP charging mode is selected. When the state of charge of second battery pack 520 is higher than or equal to threshold value SOC (0), the CV charging mode is selected.

First control portion 1111 controls first converter 410 and second converter 420 to charge second battery pack 520 in the selected charging mode. For example, second battery pack 520 is charged by raising a voltage on an output side (a side to which second converter 420 is connected) of first converter 410 higher than a voltage on an output side (a side to which first converter 410 is connected) of second converter 420. A value of electric power or a value of a current charged into second battery pack 520 is variable in accordance with a difference between the voltage on the output side of first converter 410 and the voltage on the output side of second converter 420.

In addition, first control portion 1111 controls charger 600 to charge first battery pack 510 in the selected charging mode. Charger 600 is controlled to output a current that is a sum of a current supplied to first battery pack 510 and a current supplied to second battery pack 520.

It is noted that a target value of electric power or a target value of a current supplied to first battery pack 510 is determined in accordance with, for example, the state of charge and the like of first battery pack 510. Further, in the CP charging mode, once the target value of the electric power is determined, the target value of the current is inevitably determined from the voltage of first battery pack 510.

Likewise, a target value of electric power or a target value of a current supplied to second battery pack 520 is determined in accordance with, for example, the state of charge and the like of second battery pack 520. Further, in the CP charging mode, once the target value of the electric power is determined, the target value of the current is inevitably determined from the voltage of second battery pack 520.

First converter 410, second converter 420 and charger 600 are controlled such that the value of the electric power or the value of the current supplied to first battery pack 510 or second battery pack 520 agrees with the determined target value.

Figure 4:
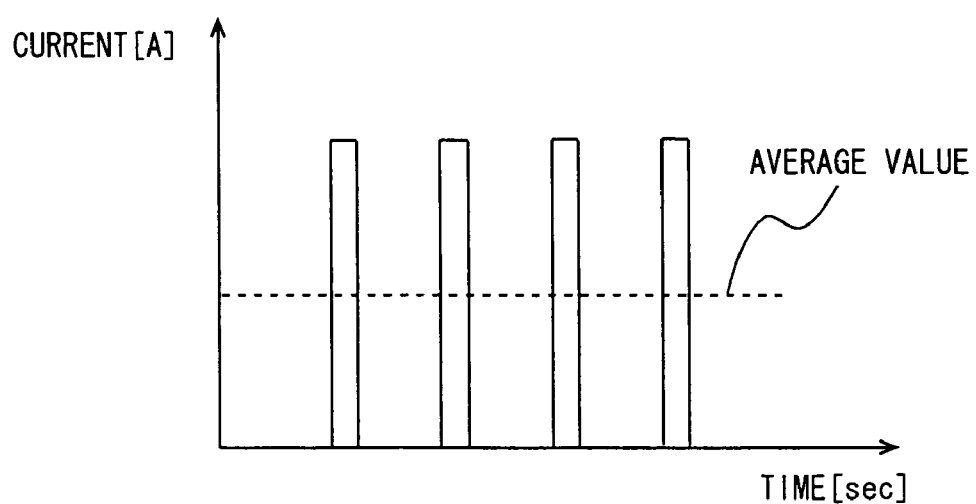
FIG. 4 shows a value of a current output from a second converter.

When the target value of the current supplied to second battery pack 520 is lower than a minimum value of a current that can be output from second converter 420, second control portion 1112 controls second converter 420 to output a current intermittently, as shown in FIG. 4. Second converter 420 is controlled such that an average value of the current output from second converter 420 attains to the target value of the current supplied to second battery pack 520. It is noted that in order to output a current intermittently, first converter 410 and charger 600 may also be controlled in addition to second converter 420.

When second converter 420 is controlled to output a current intermittently, correction portion 1114 corrects a detection value from current sensor 1022 provided between second converter 420 and second battery pack 520. More specifically, the detection value from current sensor 1022 for a period of time during which the value of the current output from second converter 420 is "0", i.e., a period of time during which a switch within second converter 420 is off, is corrected to "0". That is, correction portion 1114 learns the detection value from current sensor 1022 for a period of time during which the value of the current output from second converter 420 is "0" as an offset value, and corrects a detection value from current sensor 1022 by subtracting the offset value from the detected value.

It is noted that, when first converter 410 and charger 600 are controlled to output a current intermittently, detected values of current sensor 1021 and current sensor 1023 may be corrected for a period of time during which current values are "0".

Figure 5:
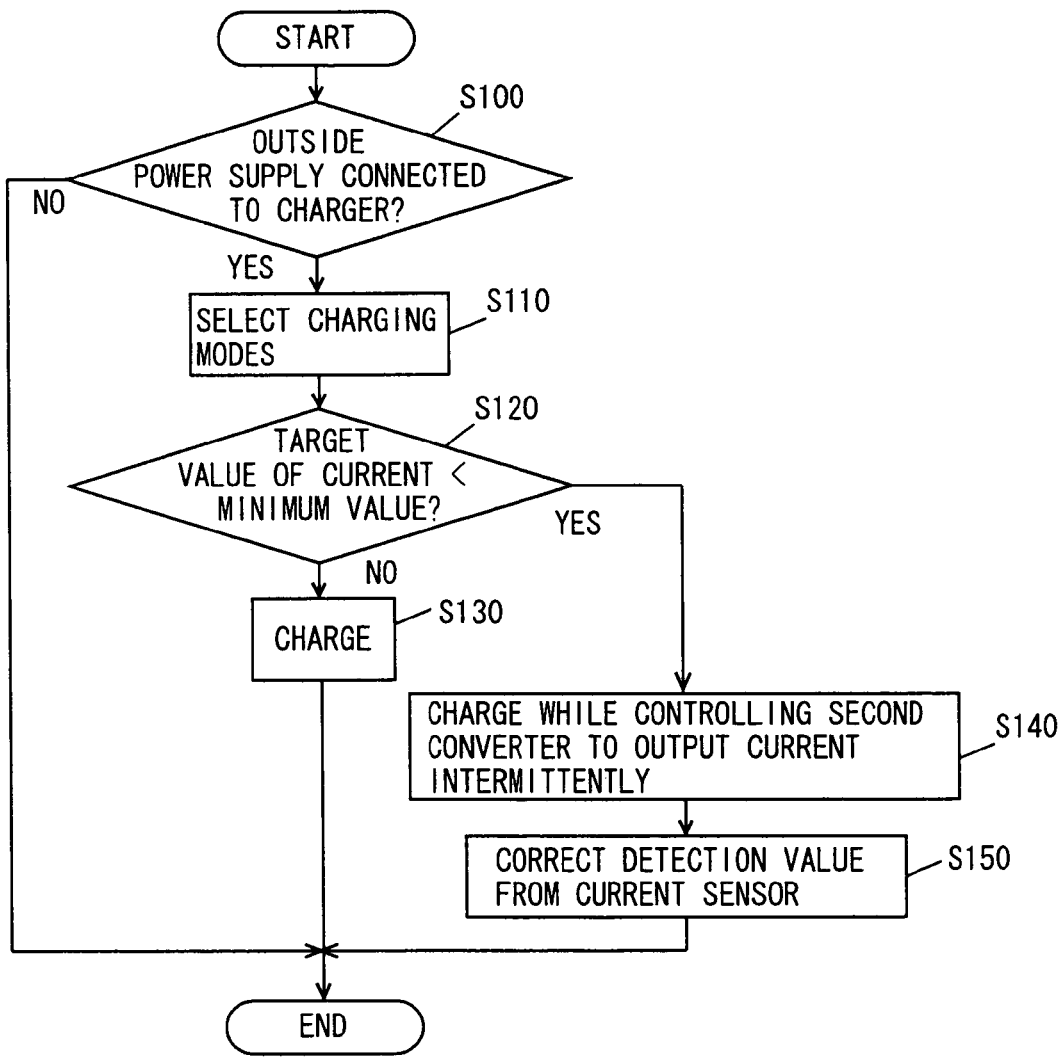
FIG. 5 shows a control structure of a program executed by the ECU.

Referring to FIG. 5, a control structure of a program executed by ECU 1000 will be described. It is noted that the program executed by ECU 1000 may be recorded onto recording media such as CDs (Compact Discs), DVDs (Digital Versatile Discs) and the like, and distributed to the market.

At step (a step will be abbreviated as S hereinafter) 100, ECU 1000 determines whether a power supply outside the hybrid vehicle has been connected to charger 600. If the power supply outside the hybrid vehicle has been connected to charger 600 (YES at S100), the process proceeds to S110. If not (NO at S100), this process ends.

At S110, ECU 1000 selects a charging mode for first battery pack 510 and a charging mode for second battery pack 520.

At S120, ECU 1000 determines whether the target value of the current supplied to second battery pack 520 is lower than the minimum value of the current that can be output from second converter 420. If the target value of the current is lower than the minimum value (YES at S120), the process proceeds to S140. If not (NO at S120), the process proceeds to S130.

At S130, ECU 1000 charges first battery pack 510 and second battery pack 520 in the selected charging modes respectively. That is, first converter 410, second converter 420 and charger 600 are controlled to charge first battery pack 510 and second battery pack 520 in the selected charging modes.

At S140, ECU 1000 charges first battery pack 510 and second battery pack 520 in the selected charging modes respectively while controlling second converter 420 to output a current intermittently.

At S150, ECU 1000 corrects the detection value from current sensor 1022 provided between second converter 420 and second battery pack 520 for a period of time during which the value of the current output from second converter 420 is "0".

The operation of ECU 1000 of the control device according to the embodiment based on the above-described structure and flowchart will be described.

When the power supply outside the hybrid vehicle is connected to charger 600 (YES at S100), the charging mode for first battery pack 510 and the charging mode for second battery pack 520 are selected (S110).

If the target value of the current supplied to second battery pack 520 is lower than the minimum value of the current that can be output from second converter 420 (YES at S120), first battery pack 510 and second battery pack 520 are charged in the selected charging modes respectively while second converter 420 is controlled to output a current intermittently (S140).

Figure 6:
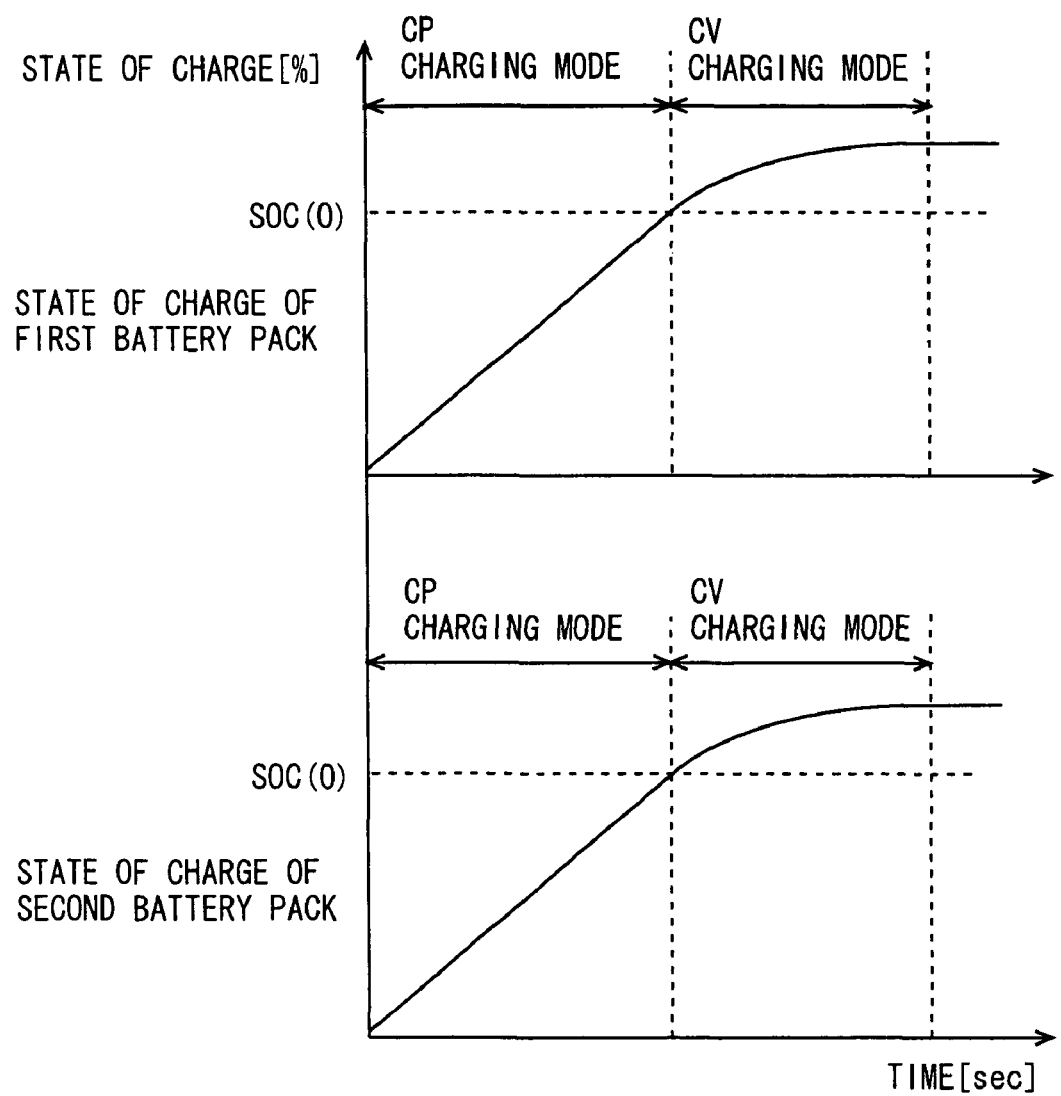
FIG. 6 is a (first) diagram showing states of charge of battery packs.

For example, when the state of charge of first battery pack 510 and the state of charge of second battery pack 520 at the onset of charge are lower than threshold value SOC (0), first battery pack 510 and second battery pack 520 may be charged simultaneously in the CP charging mode and the CV charging mode, as shown in FIG. 6.

Figure 7:
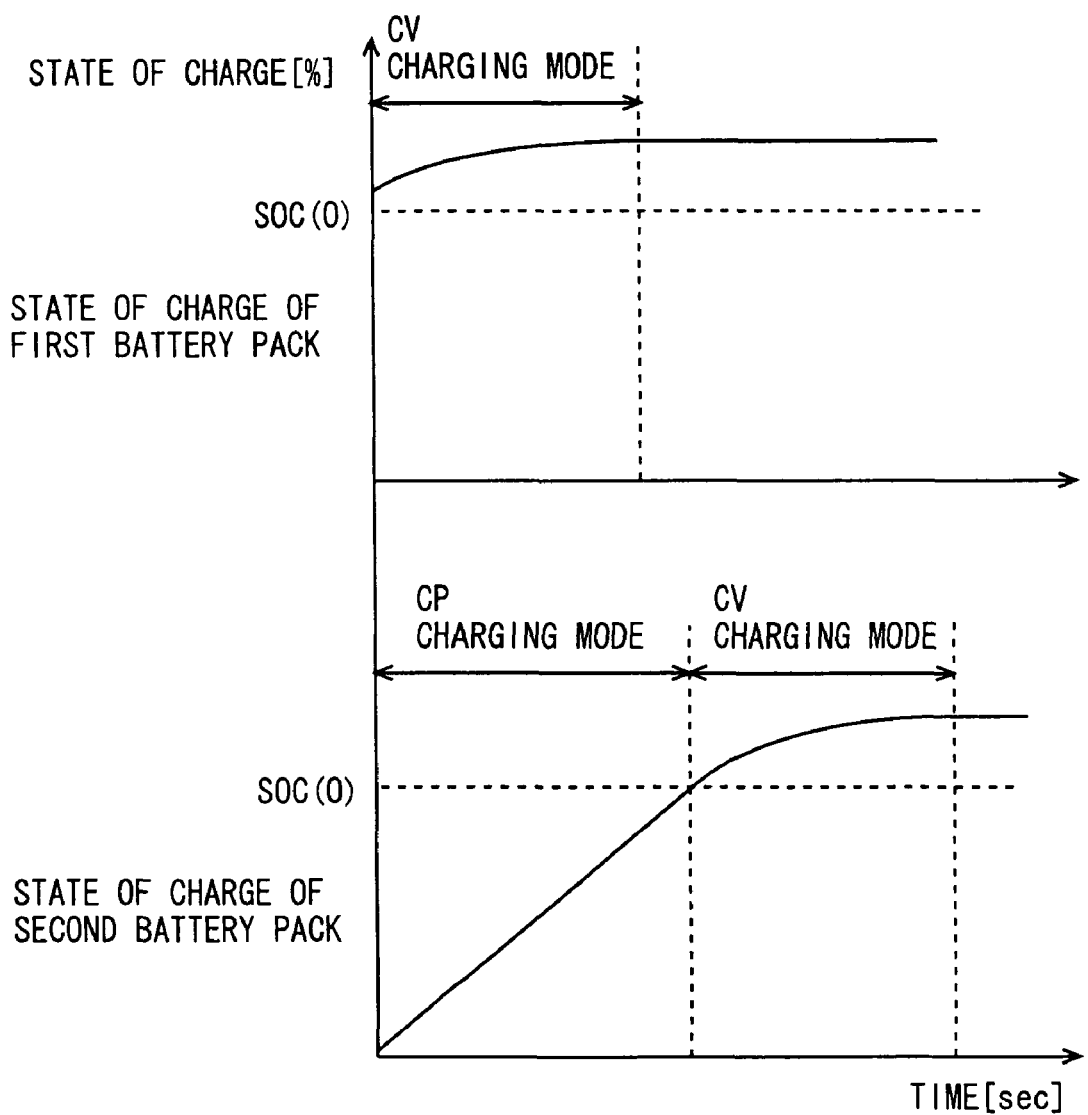
FIG. 7 is a (second) diagram showing states of charge of the battery packs.

When the state of charge of first battery pack 510 is higher than or equal to threshold value SOC (0) and the state of charge of second battery pack 520 is lower than threshold value SOC (0), first battery pack 510 may be charged in the CV charging mode, and second battery pack 520 may be charged in the CP charging mode and the CV charging mode, as shown in FIG. 7.

Figure 8:
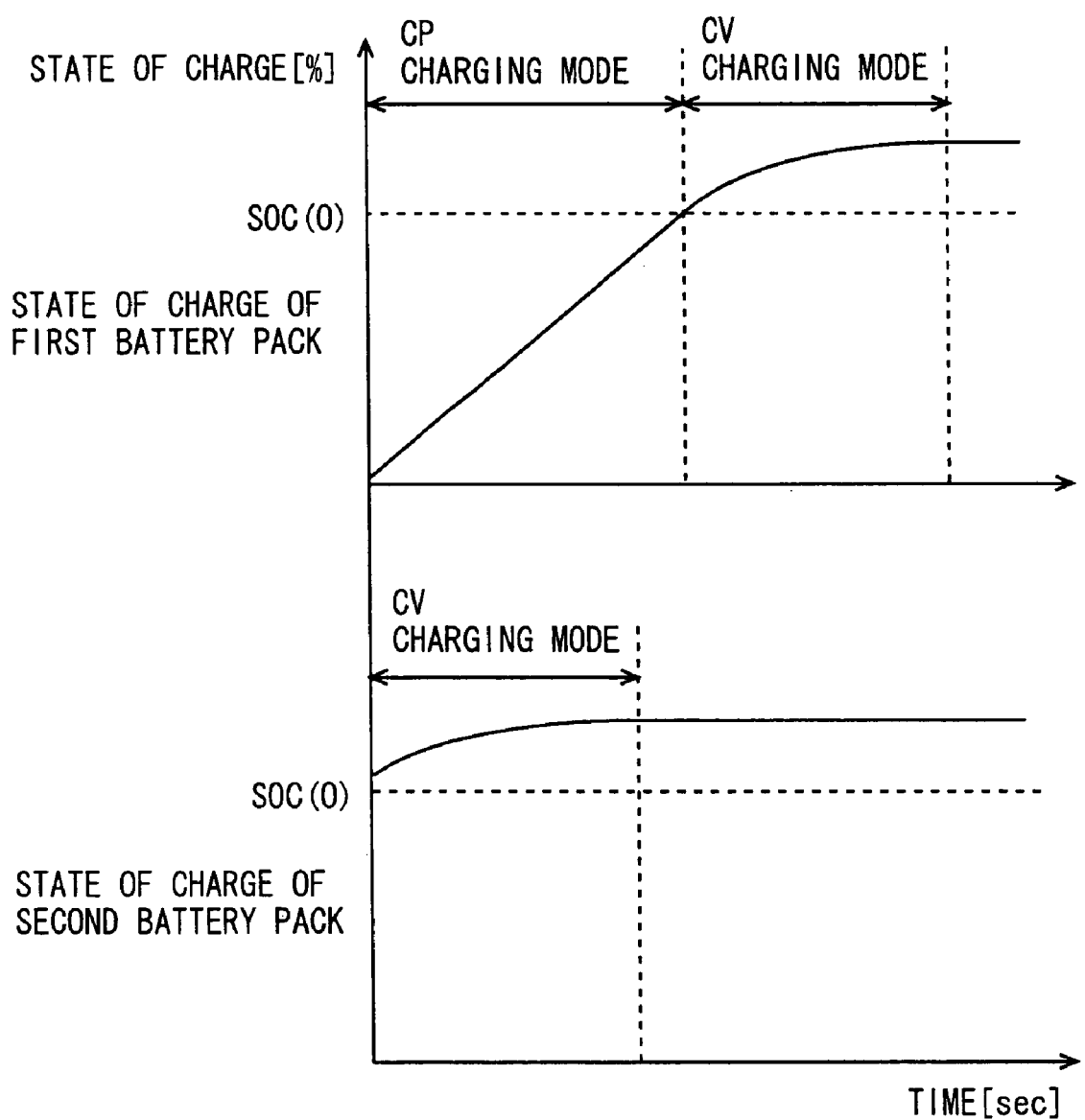
FIG. 8 is a (third) diagram showing states of charge of the battery packs.

When the state of charge of first battery pack 510 is lower than threshold value SOC (0) and the state of charge of second battery pack 520 is higher than or equal to threshold value SOC (0), first battery pack 510 may be charged in the CP charging mode and the CV charging mode, and second battery pack 520 may be charged in the CV charging mode, as shown in FIG. 8.

If charging to one of first battery pack 510 and second battery pack 520 has been completed, only the other battery pack may be charged.

Figure 9:
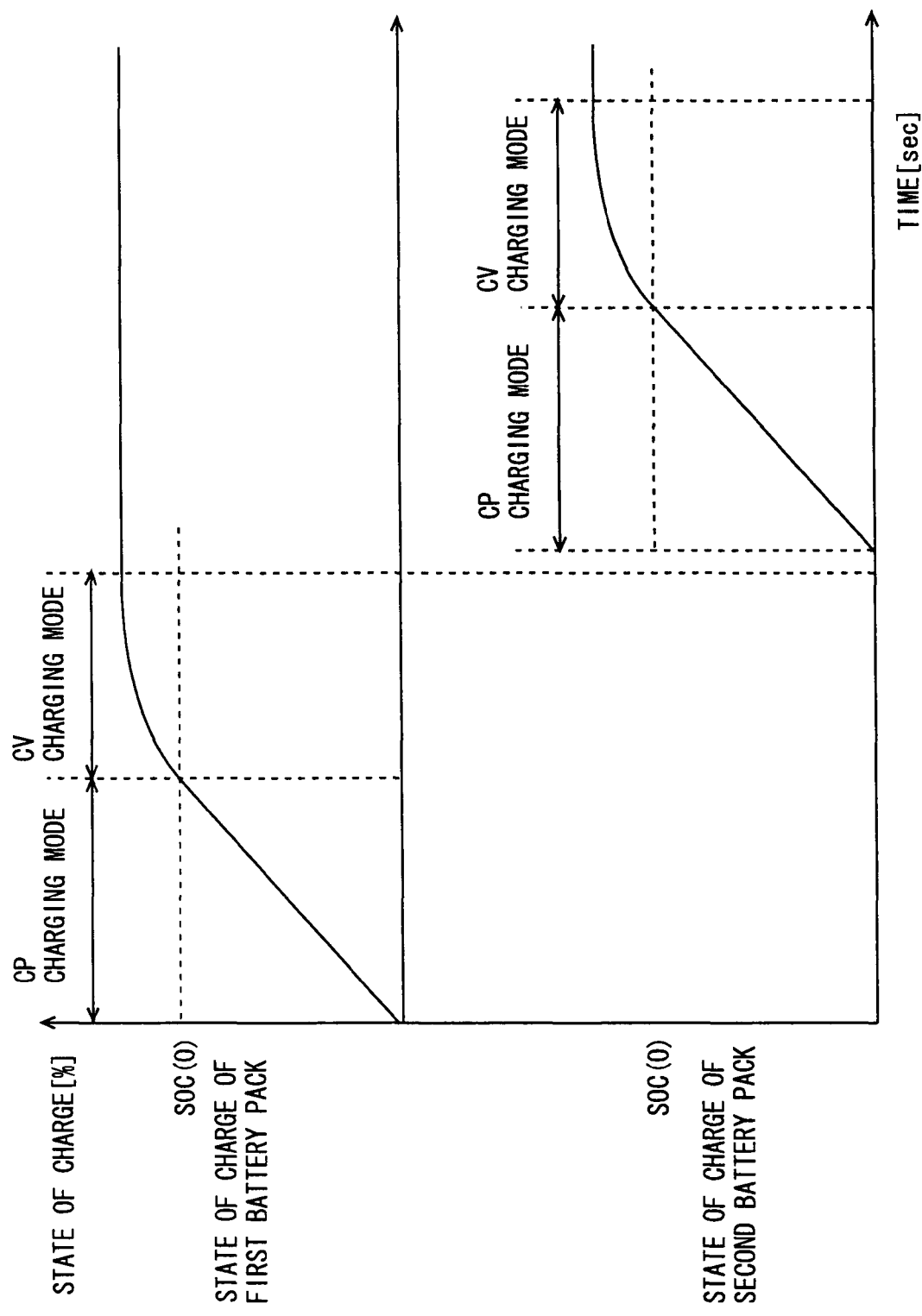
FIG. 9 is a (fourth) diagram showing states of charge of the battery packs.
Figure 10:
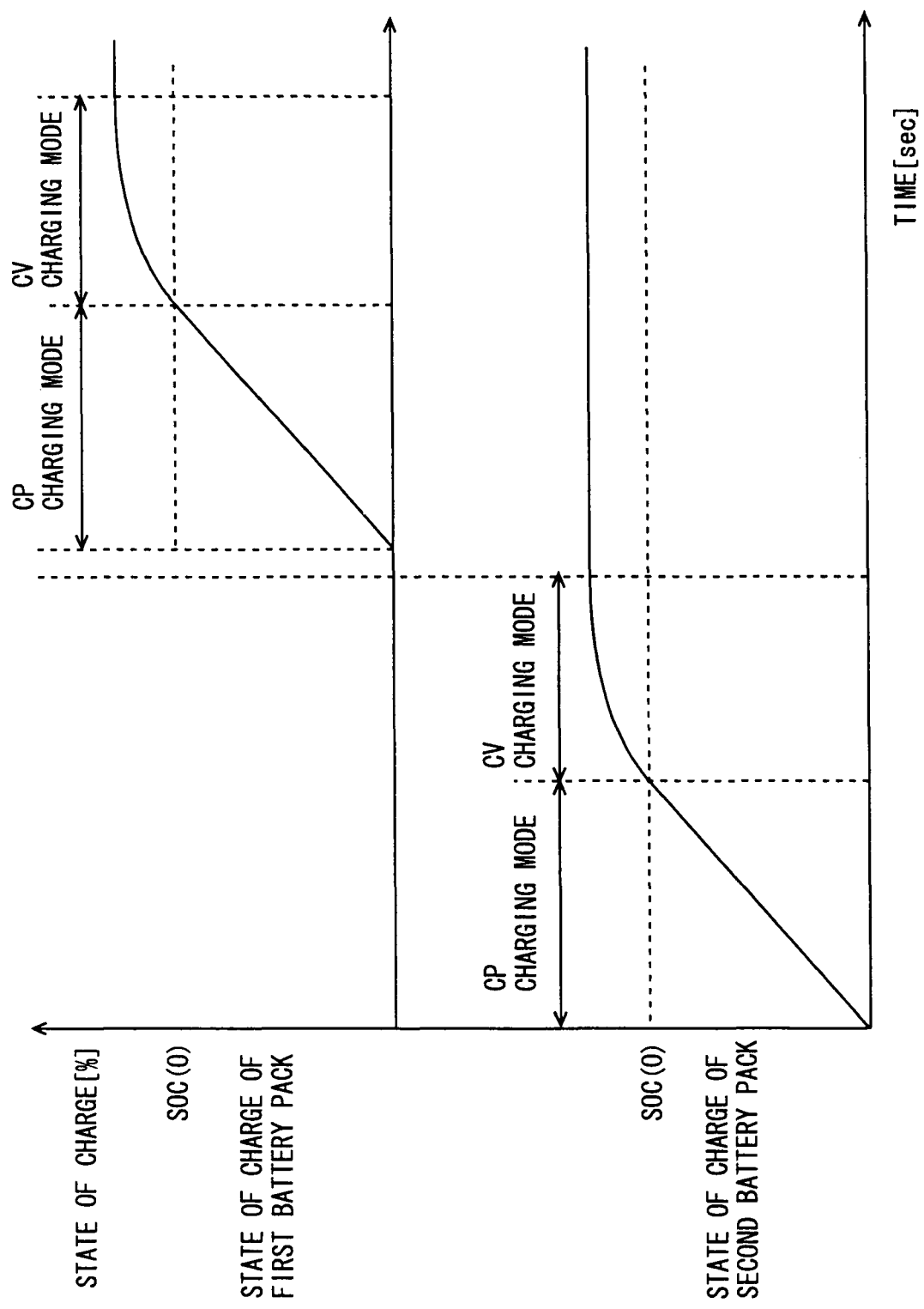
FIG. 10 is a (fifth) diagram showing states of charge of the battery packs.

It is noted that instead of charging first battery pack 510 and second battery pack 520 simultaneously, first battery pack 510 may be charged followed by charging to second battery pack 520, as shown in FIG. 9. Conversely, second battery pack 520 may be charged followed by charging to first battery pack 510, as shown in FIG. 10.

Even when first battery pack 510 and second battery pack 520 are charged in an alternating manner, one of the battery packs may be charged in the CV charging mode and the other battery pack may be charged in the CP charging mode and the CV charging mode, depending on the states of charge of the battery packs.

For a period of time during which the value of the current output from second converter 420 is "0", the detection value from current sensor 1022 provided between second converter 420 and second battery pack 520 is corrected (S150).

If the target value of the current supplied to second battery pack 520 is higher than or equal to the minimum value of the current that can be output from second converter 420 (NO at S130), first battery pack 510 and second battery pack 520 are charged in the selected charging modes respectively (S130). At this time, second converter 420 is controlled to output a current continuously.

As described above, the control device for the electric system according to the present embodiment selects the charging modes individually for the first battery pack and the second battery pack connected in parallel to each other. The first converter, the second converter and the charger are controlled to charge the first battery pack and the second battery pack in the selected charging modes respectively. Accordingly, each battery pack can be charged in a charging mode appropriate to the condition of each battery pack, thereby charging all the battery packs sufficiently, i.e., achieving equal states of charge of the respective battery packs. Consequently, the difference in rates of deterioration among the battery packs can be reduced.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A control device for an electric system, comprising:
a first converter for varying a voltage;
a second converter connected in parallel to said first converter for varying a voltage;
a first power storage mechanism connected to said first converter for storing electric power;
a second power storage mechanism connected to said second converter for storing electric power;
a charger connected to said first power storage mechanism to supply electric power; and
an operation unit, wherein
said operation unit selects a charging mode for said first power storage mechanism, selects a charging mode for said second power storage mechanism, and controls said charger, said first converter and said second converter to charge at least any one of said first power storage mechanism and said second power storage mechanism in the selected mode.

2. The control device for an electric system according to claim 1, wherein
said operation unit controls said first converter and said second converter to charge said second power storage mechanism in the selected mode, and controls said charger to charge said first power storage mechanism in the selected mode.

3. The control device for an electric system according to claim 2, wherein
said operation unit controls said charger to charge said first power storage mechanism in the selected mode by outputting a current that is a sum of a current supplied to said first power storage mechanism and a current supplied to said second power storage mechanism.

4. The control device for an electric system according to claim 1, wherein
said operation unit selects either a mode of maintaining electric power to be charged into said first power storage mechanism constant or a mode of maintaining a current to be charged into said first power storage mechanism constant, and selects either a mode of maintaining electric power to be charged into said second power storage mechanism constant or a mode of maintaining a current to be charged into said second power storage mechanism constant.

5. The control device for an electric system according to claim 4, wherein said operation unit selects the mode of maintaining the electric power to be charged into said first power storage mechanism constant when a state of charge of said first power storage mechanism is lower than a threshold value, and selects the mode of maintaining the current to be charged into said first power storage mechanism constant when the state of charge of said first power storage mechanism is higher than the threshold value, and said operation unit selects the mode of maintaining the electric power to be charged into said second power storage mechanism constant when a state of charge of said second power storage mechanism is lower than the threshold value, and selects the mode of maintaining the current to be charged into said second power storage mechanism constant when the state of charge of said second power storage mechanism is higher than the threshold value.

6. The control device for an electric system according to claim 1, wherein when a target value of a current charged into said second power storage mechanism is lower than a minimum value of a current output from said second converter, said operation unit controls said second converter to output a current intermittently.

7. The control device for an electric system according to claim 1, wherein said operation unit controls said charger, said first converter and said second converter to charge said first power storage mechanism and said second power storage mechanism simultaneously in charging modes different between said first power storage mechanism and said second power storage mechanism.

8. A control method for an electric system including a first converter for varying a voltage, a second converter connected in parallel to said first converter for varying a voltage, a first power storage mechanism connected to said first converter for storing electric power, a second power storage mechanism connected to said second converter for storing electric power, and a charger connected to said first power storage mechanism to supply electric power, comprising the steps of:

selecting a charging mode for said first power storage mechanism;

selecting a charging mode for said second power storage mechanism; and controlling said charger, said first converter and said second converter to charge at least any one of said first power storage mechanism and said second power storage mechanism in the selected mode.

9. The control method for an electric system according to claim 8, wherein said step of controlling said charger, said first converter and said second converter includes the steps of controlling said first converter and said second converter to charge said second power storage mechanism in the selected mode, and controlling said charger to charge said first power storage mechanism in the selected mode.

10. The control method for an electric system according to claim 9, wherein said step of controlling said charger includes the step of controlling said charger to charge said first power storage mechanism in the selected mode by outputting a current that is a sum of a current supplied to said first power storage mechanism and a current supplied to said second power storage mechanism.

11. The control method for an electric system according to claim 8, wherein said step of selecting a charging mode for said first power storage mechanism includes the step of selecting either a mode of maintaining electric power to be charged into said first power storage mechanism constant or a mode of maintaining a current to be charged into said first power storage mechanism constant, and said step of selecting a charging mode for said second power storage mechanism includes the step of selecting either a mode of maintaining electric power to be charged into said second power storage mechanism constant or a mode of maintaining a current to be charged into said second power storage mechanism constant.

12. The control method for an electric system according to claim 11, wherein said step of selecting either a mode of maintaining electric power to be charged into said first power storage mechanism constant or a mode of maintaining a current to be charged into said first power storage mechanism constant includes the step of selecting the mode of maintaining the electric power to be charged into said first power storage mechanism constant when a state of charge of said first power storage mechanism is lower than a threshold value, and selecting the mode of maintaining the current to be charged into said first power storage mechanism constant when the state of charge of said first power storage mechanism is higher than the threshold value, and said step of selecting either a mode of maintaining electric power to be charged into said second power storage mechanism constant or a mode of maintaining a current to be charged into said second power storage mechanism constant includes the step of selecting the mode of maintaining the electric power to be charged into said second power storage mechanism constant when a state of charge of said second power storage mechanism is lower than the threshold value, and selecting the mode of maintaining the current to be charged into said second power storage mechanism constant when the state of charge of said second power storage mechanism is higher than the threshold value.

13. The control method for an electric system according to claim 8, further comprising the step of:

controlling, when a target value of a current charged into said second power storage mechanism is lower than a minimum value of a current output from said second converter, said second converter to output a current intermittently.

14. The control method for an electric system according to claim 8, wherein said step of controlling said charger, said first converter and said second converter includes the step of controlling said charger, said first converter and said second converter to charge said first power storage mechanism and said second power storage mechanism simultaneously in charging modes different between said first power storage mechanism and said second power storage mechanism.

15. A control device for an electric system, comprising:
a first converter for varying a voltage;
a second converter connected in parallel to said first converter for varying a voltage;
a first power storage mechanism connected to said first converter for storing electric power;
a second power storage mechanism connected to said second converter for storing electric power;
a charger connected to said first power storage mechanism to supply electric power;
first selection means for selecting a charging mode for said first power storage mechanism;
second selection means for selecting a charging mode for said second power storage mechanism; and
control means for controlling said charger, said first converter and said second converter to charge at least any one of said first power storage mechanism and said second power storage mechanism in the selected mode.

16. The control device for an electric system according to claim 15, wherein
said control means includes
means for controlling said first converter and said second converter to charge said second power storage mechanism in the selected mode, and
charger control means for controlling said charger to charge said first power storage mechanism in the selected mode.

17. The control device for an electric system according to claim 16, wherein
said charger control means includes means for controlling said charger to charge said first power storage mechanism in the selected mode by outputting a current that is a sum of a current supplied to said first power storage mechanism and a current supplied to said second power storage mechanism.

18. The control device for an electric system according to claim 15, wherein
said first selection means includes first mode selection means for selecting either a mode of maintaining electric power to be charged into said first power storage mechanism constant or a mode of maintaining a current to be charged into said first power storage mechanism constant, and
said second selection means includes second mode selection means for selecting either a mode of maintaining electric power to be charged into said second power storage mechanism constant or a mode of maintaining a current to be charged into said second power storage mechanism constant.

19. The control device for an electric system according to claim 18, wherein
said first mode selection means includes means for selecting the mode of maintaining the electric power to be charged into said first power storage mechanism constant when a state of charge of said first power storage mechanism is lower than a threshold value, and selecting the mode of maintaining the current to be charged into said first power storage mechanism constant when the state of charge of said first power storage mechanism is higher than the threshold value, and
said second mode selection means includes means for selecting the mode of maintaining the electric power to be charged into said second power storage mechanism constant when a state of charge of said second power storage mechanism is lower than the threshold value, and selecting the mode of maintaining the current to be charged into said second power storage mechanism constant when the state of charge of said second power storage mechanism is higher than the threshold value.

20. The control device for an electric system according to claim 15, further comprising means for controlling, when a target value of a current charged into said second power storage mechanism is lower than a minimum value of a current output from said second converter, said converter to output a current intermittently.

21. The control device for an electric system according to claim 15, wherein
said control means includes means for controlling said charger, said first converter and said second converter to charge said first power storage mechanism and said second power storage mechanism simultaneously in charging modes different between said first power storage mechanism and said second power storage mechanism.

* * * * *